United States Patent [19]

Zapala

[11] 4,071,864

[45] Jan. 31, 1978

[54] FLEXIBLE RECORDING HEAD MOUNTING ASSEMBLY

[75] Inventor: Raymond J. Zapala, Anaheim, Calif.

[73] Assignee: The United States of America as represented by the Secretary of the Air Force, Washington, D.C.

[21] Appl. No.: 649,761

[22] Filed: Jan. 16, 1976

[51] Int. Cl.² .......................... G11B 5/60; G11B 5/48; G11B 17/32; G11R 21/20

[52] U.S. Cl. .................................. 360/103; 360/104; 360/130

[58] Field of Search ............... 360/103, 104, 105, 109, 360/130, 128–129

[56] References Cited

U.S. PATENT DOCUMENTS

| | | | |
|---|---|---|---|
| 2,783,311 | 2/1957 | Scott | 360/104 |
| 2,937,240 | 5/1960 | Harker | 360/103 |
| 3,151,319 | 9/1964 | Marrs | 360/103 |
| 3,249,701 | 5/1966 | Silver | 360/103 |
| 3,488,648 | 1/1970 | Church | 360/103 |
| 3,705,397 | 12/1972 | Gerkema | 360/103 |
| 3,763,331 | 10/1973 | Kinjo | 360/103 |

Primary Examiner—Alfred H. Eddleman
Attorney, Agent, or Firm—Joseph E. Rusz; Henry S. Miller

[57] ABSTRACT

A flexible recording head mounting assembly where the head is secured to a cap which is supported by a pressure sensitive diaphram, the head being pivotally secured to the cap and having an off center shoe located near the pick-up end so that the head is inclined to a recording medium and a hydrodynamic force minimizes the space between the head and moving recording medium.

1 Claim, 1 Drawing Figure

U.S. Patent      Jan. 31, 1978      4,071,864
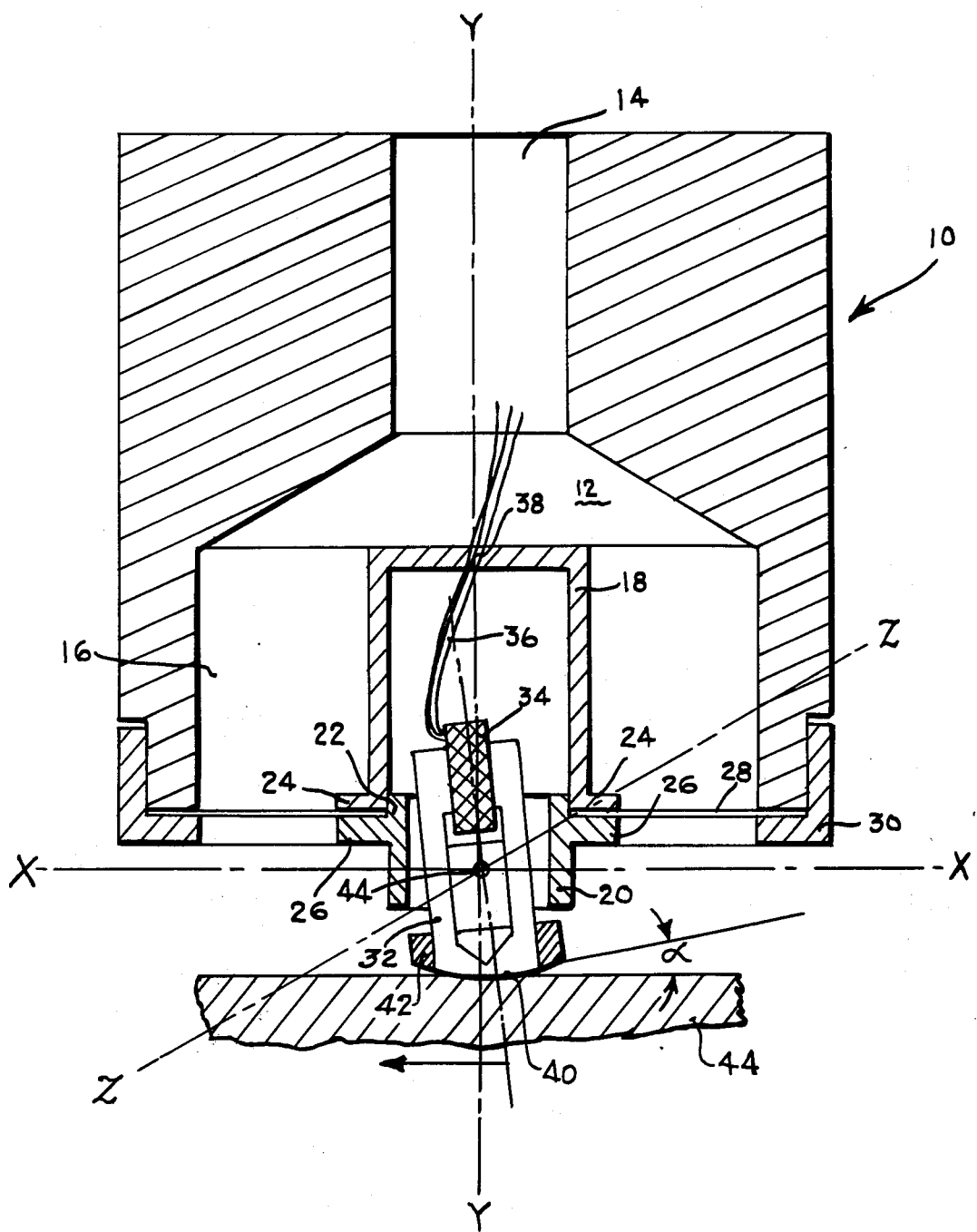

FLEXIBLE RECORDING HEAD MOUNTING ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to recording heads, and more particularly to a flexible mounting assembly for recording heads.

It has long been the object of research and development programs to achieve a means by which to mount a recording head at an infitisimal distance from a rotating disk or drum in information storage systems. Rotating disk and drum systems are well known in the information retreval art. However, the desire for increased storage capacity has developed a multitude of various recording head assemblies. The problem sought to be overcome is the limited ability of recorder heads to discriminate between bits of information. The most practical solution is to space information in a manner whereby a recording head will be able to operate effectively. In an effort to increase storage capacity, information is more closely spaced which in turn requires that the recording head be positioned more closely to the moving surface. This process is continued to an extreme where variations in the thickness of surface coatings becomes one of the major limiting factors.

One of the more novel approaches to the solution of the problem is created by providing a hydrostatic cushion or film of air for floating a recording head. The head is held near the recording medium until a desired relative speed is attained and after which the hydrostatic cushion is removed permitting the recording head to "fly" on a hydrodynamic air film or cushion generated between the stationary recording head and the rotating medium.

Regardless of the approach used, all prior art types of flying recording heads have been complex, difficult to maintain, expensive to operate and have had only limited success in reducing the space between recording head and recording medium.

SUMMARY OF THE INVENTION

The invention solves the problem of the prior art by providing a flexible member for self-alignment of the recording head. Proper design of the recording head in addition to its flexability controls the head to disk or drum spacing by means of a hydrodynamic air bearing.

The recording head is mounted on a cylindrical surfaced shoe whose center line is offset from the center line of the crown of the shoe. Two intersecting shafts are mounted within the center of the head to allow pivot motion for self-alignment to equalize the loads carried by the shoe. This assembly is fixed to a diaphram located in the housing and sealed off from the housing by means of a cap. When the housing interior is pressurized, the diaphram will extend the assembly toward the rotating disc. Since the shoe is free to incline at the pivot point, a convergent wedge is established which generates a hydrodynamic pressure. The resultant force passes through the pivot point which is equal and opposite to the applied load. The inclined position of the shoe locates the head at a minimum distance from the disc, which results in a high bit density recording.

It is, therefore, an object of the invention to provide a new and improved recording head support assembly.

It is another object of the invention to provide a new and improved recording head support assembly that is pivotally mounted.

It is a further object of the invention to provide a new and improved recording head support assembly that is simple in construction.

It is still another object of the invention to provide a new and improved recording head support assembly that easily maintained.

It is still a further object of the invention to provide a new and improved recording head support assembly that is inexpensive to operate.

It is another object of the invention to provide a new and improved recording head assembly that reduces the head to medium spacing to a minimum.

These and other advantages, features and objects of the invention will become more apparent from the following description taken in connection with the illustrative embodiment in the accompanying drawing.

DESCRIPTION OF THE DRAWING

The FIGURE is a side elevation view of the invention taken partly in section.

DESCRIPTION OF THE PREFERRED EMBODIMENT

Referring now to the FIGURE, generally at 10, is shown a housing suitably adapted in size and shape to form part of an information recording and retrieving system. A chamber 12 is formed within the housing having a relatively small passageway 14 extending into a larger cylindrically shaped region 16.

Within the larger region is a cup 18 secured in position, along the centerline of the cylindrically shaped region, by a ring 20. The cup and ring are provided with mating portions 22 which include extending flanges 24, 26 which grasp a diaphram 28 that is in turn held periphirally to the housing 10 by the locking member 30.

Within the ring is the recording head 32, having a magnetic coil 34 and associated wiring 36 passing through the aperture 38 in the cap 18 to its appropriate connection. Extending beyond the ring and generally along the center line axis, the recording head terminates in a pickup 40 at the end of the recording head.

Surrounding the cylindrically shaped recording head 32, adjacent the pickup end is a cylindrical surfaced shoe 42 whose centerline is offset from the center line of the crown of the recording head 32.

Two intersecting shafts following the X and Z axis, are mou nted within the center of the head to allow a pivot motion at 44 for self-alignment to equalize the loads carried by the shoe.

In operation, the interior of the housing 10 is pressurized through the passage 14 with air or other suitable fluid. A specified amount of pressure is applied to distend the diaphram 28 and extend the recording head 32 toward the rotating recording medium 44. Since the shoe 42 attached to the head 32 is free to incline at the pivot point 44, a convergent wedge is established between the recording head pickup 40 and the rotating medium 44 which generates a hydrodynamic pressure with the the ambient fluid. The resultant force passes through the pivot point which is equal and opposite to the applied load. The inclined position of the shoe locates the head at a minimum distance from the disk which in turn results in a high bit density recording.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A flexible recording head mounting assembly for information recording systems having one moving member positioned in a close spaced relationship comprising: a housing; a cylindrically shaped chamber open at one end and reduced to a passage at the other end, in the housing; a flexible diaphram positioned across the open end of the chamber; a cup shaped means within the chamber extending through the diaphram and secured thereto; a recording head pivotally mounted to said cup-shaped means and a shoe means affixed to the recording head and adjacent an end distally from the pivot mount and having a cylindrical surface whose center line is offset from the recording head whereby the head will be inclined to the moving member and spaced therefrom by a hydrodynamic bearing created by said inclination.

* * * * *